(12) United States Patent
Okochi et al.

(10) Patent No.: US 11,724,483 B2
(45) Date of Patent: Aug. 15, 2023

(54) LAMINATED RESIN FILM

(71) Applicant: NIPPON SHOKUBAI CO., LTD., Osaka (JP)

(72) Inventors: Hiroko Okochi, Hyogo (JP); Tomonari Takata, Hyogo (JP); Yasutaka Nakatani, Hyogo (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 411 days.

(21) Appl. No.: 16/324,210

(22) PCT Filed: Aug. 9, 2017

(86) PCT No.: PCT/JP2017/028915
§ 371 (c)(1),
(2) Date: Feb. 8, 2019

(87) PCT Pub. No.: WO2018/030461
PCT Pub. Date: Feb. 15, 2018

(65) Prior Publication Data
US 2019/0176447 A1    Jun. 13, 2019

(30) Foreign Application Priority Data
Aug. 10, 2016    (JP) ................... 2016-158146

(51) Int. Cl.
*B32B 27/18*    (2006.01)
*B32B 3/10*    (2006.01)
*B32B 27/32*    (2006.01)

(52) U.S. Cl.
CPC ............... *B32B 27/18* (2013.01); *B32B 3/10* (2013.01); *B32B 27/32* (2013.01);
(Continued)

(58) Field of Classification Search
CPC ..... B29C 48/0018; B29C 48/08; B29C 48/21; B29C 55/005; B29C 55/12; B29D 7/01;
(Continued)

(56) References Cited

U.S. PATENT DOCUMENTS

| 5,858,552 A | 1/1999 | Bader et al. |
| 2002/0068158 A1 | 6/2002 | Peiffer et al. |

(Continued)

FOREIGN PATENT DOCUMENTS

| JP | 6-155688 | 6/1994 |
| JP | H11106520 A | * 4/1999 |

(Continued)

OTHER PUBLICATIONS

English machine translation for the description of KR-20110078717-A, obtained from ESPACENET (Year: 2011).*

(Continued)

*Primary Examiner* — James C Yager
*Assistant Examiner* — Thomas J Kessler
(74) *Attorney, Agent, or Firm* — Wenderoth, Lind & Ponack, L.L.P.

(57) ABSTRACT

The objective of the present invention is to, in a resin film containing an anti-blocking agent (organic polymer particles), achieve both a reduction in friction of the film and suppression of dropping-off of particles from the film surface. The laminated resin film of the present invention has a base film layer and a surface layer, and the surface layer contains organic polymer particles serving as an anti-blocking agent. The number proportion of the organic polymer particles having a particle size that is at least twice the average thickness of the surface layer is 35% or more of the total number of the organic polymer particles, and the number proportion of the organic polymer particles having a particle size that is at least four times the average thickness (Continued)

(a)

(b)

(c)

(d)

of the surface layer is 10% or less of the total number of the organic polymer particles.

12 Claims, 2 Drawing Sheets

(52) U.S. Cl.
CPC ..... *B32B 2255/26* (2013.01); *B32B 2264/025* (2013.01); *B32B 2264/0235* (2013.01); *B32B 2307/746* (2013.01)

(58) Field of Classification Search
CPC ..... B29K 2105/251; B32B 3/10; B32B 27/08; B32B 27/18; B32B 27/32; B32B 2250/02; B32B 2250/03; B32B 2250/24; B32B 2255/26; B32B 2260/025; B32B 2260/046; B32B 2264/0235; B32B 2264/025; B32B 2307/518; B32B 2307/732; B32B 2307/746
See application file for complete search history.

(56) References Cited

U.S. PATENT DOCUMENTS

| | | | |
|---|---|---|---|
| 2002/0160168 A1 | 10/2002 | Peiffer et al. | |
| 2004/0142147 A1 | 7/2004 | Peiffer et al. | |
| 2019/0176447 A1 | 6/2019 | Okochii et al. | |

FOREIGN PATENT DOCUMENTS

| | | | |
|---|---|---|---|
| JP | 2000-191708 | | 7/2000 |
| JP | 2001-162750 | | 6/2001 |
| JP | 2002-200723 | | 7/2002 |
| JP | 2002-307634 | | 10/2002 |
| JP | 2003-205584 | | 7/2003 |
| JP | 2012111172 A | * | 6/2012 |
| JP | 2015067694 A | * | 4/2015 |
| JP | 6675489 | | 4/2020 |
| KR | 20110078717 A | * | 7/2011 |

OTHER PUBLICATIONS

English machine translation of the description of JP-2012111172-A, obtained from ESPACENET (Year: 2000).*

English machine translation of the description of JP-H11106520-A, obtained from ESPACENET (Year: 1999).*

English machine translation of JP-2015067694-A, obtained from PE2E (Year: 2015).*

Extended European Search Report dated Mar. 2, 2020 in corresponding European Patent Application No. 17839528.1.

Momentive, "Fine Particle Silicone Resin Tospearl 145", Product Data, 2007, XP055670562, Retrieved from the Internet: URL: http://www.hsenc.com/intra/product/upfile/product/201402070504408.pdf.

Notice of Submission of Information by Third Parties issued Nov. 19, 2019 in corresponding Japanese Patent Application No. 2018-533533, with English-language translation.

Notification of Reasons for Rejection dated Sep. 10, 2019 in corresponding Japanese Office Action 2018-533533, with English Translation.

International Search Report dated Nov. 7, 2017 in International (PCT) Application No. PCT/JP2017/028915.

Notice of Reasons for Refusal dated Mar. 16, 2021 in corresponding Japanese Patent Application No. 2020-040581, with English Translation.

* cited by examiner

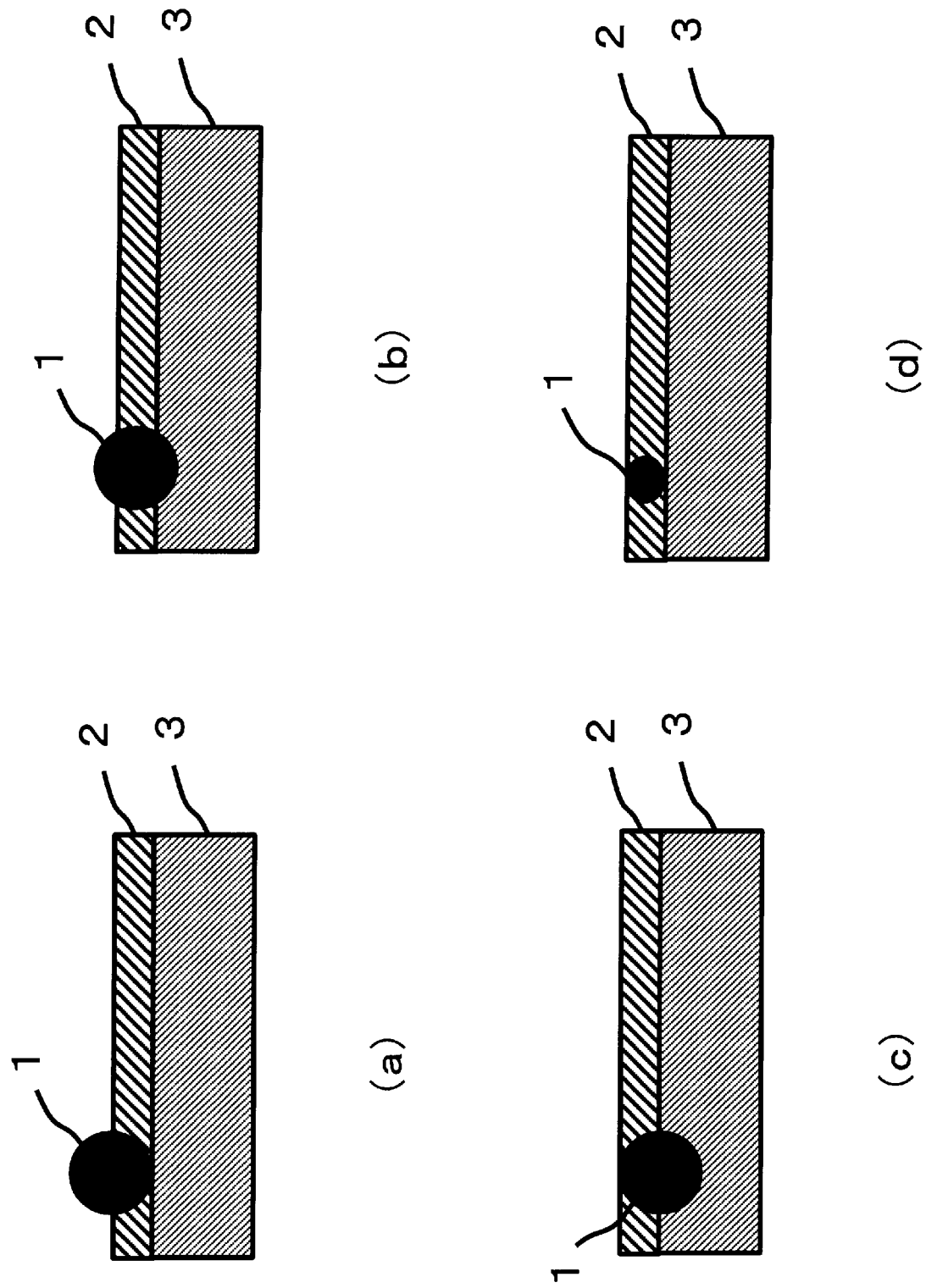
[Figure 1]

[Figure 2]
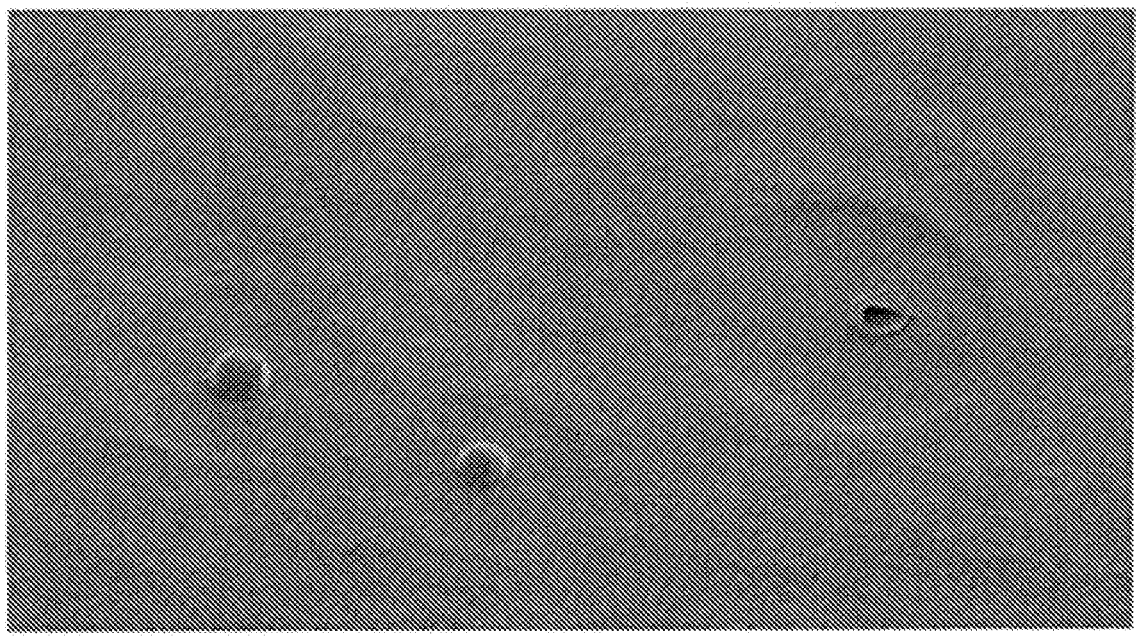

LAMINATED RESIN FILM

TECHNICAL FIELD

The present invention relates to a laminated resin film containing organic polymer particles serving as an anti-blocking agent.

BACKGROUND ART

A resin film is widely used as various packaging materials. When a resin film is stored in a rolled or stacked state, blocking occurs between the films, so that the films may be less likely to slide or be peeled off. To prevent such blocking, an anti-blocking agent is used. The term "film" simply described herein is referred to as a "resin film" unless otherwise indicated.

As an anti-blocking agent, a resin particle is widely used from the viewpoints of maintaining transparency of a film and suppressing a film from being damaged. For example, Patent Document 1 discloses a polymer particle in which a particle size distribution is narrow and in which the proportion of a non-crosslinkable monomer and a crosslinkable monomer forming the particle is adjusted.

PRIOR ART DOCUMENT

Patent Document

Patent Document 1: JP-A-2000-191708

SUMMARY OF THE INVENTION

Problems to be Solved by the Invention

Since the polymer particle disclosed in Patent Document 1 has a narrow particle size distribution, friction of a film can be reduced. However, it is difficult to sufficiently suppress dropping-off of particles from the film. The occurrence of dropping-off of particles may cause contamination of the resin film surface, so that the appearance may be sometimes impaired.

The present invention was completed under such circumstances. An objective of the present invention is to, in a resin film containing an anti-blocking agent (organic polymer particles), achieve both a reduction in friction of the film and suppression of dropping-off of particles from the film surface.

Solutions to the Problems

In order to solve the above problems, the inventors of the present invention conducted intensive studies focusing on the relationship between the thickness of a surface layer of a laminated resin film and the particle size of organic polymer particles (hereinafter may be referred to simply as "particles"). As a result, the inventors discovered that particles having a particle size larger than the thickness of the surface layer contribute to a reduction in friction, whereas particles having a too large particle size relative to the thickness of the surface layer easily drop off from the film, and the resin film surface tends to be contaminated. The inventors found that by decreasing the proportion of the particles that easily drop off and cause contamination of the resin film surface while maintaining the proportion of the particles that contribute to a reduction in friction at a predetermined level or more, both a reduction in friction of the film and suppression of dropping-off of particles from the film surface can be achieved. The present invention was accomplished based on the above findings.

The present invention comprises the following inventions.

[1] A laminated resin film comprising a base film layer and a surface layer, the surface layer comprising organic polymer particles serving as an anti-blocking agent, wherein a number proportion of the organic polymer particles having a particle size that is at least twice an average thickness of the surface layer is 35% or more of a total number of the organic polymer particles, and wherein a number proportion of the organic polymer particles having a particle size that is at least four times an average thickness of the surface layer is 10% or less of a total number of the organic polymer particles.

[2] The laminated resin film according to [1], wherein a content of the organic polymer particles is 0.01 mass % or more and 5 mass % or less in 100 mass % of all components, which include the organic polymer particles, constituting the surface layer.

[3] The laminated resin film according to [1] or [2], wherein the organic polymer particles have a coefficient of variation of particle size of 20% or more and 50% or less on a volume basis.

[4] The laminated resin film according to any of [1] to [3], wherein the organic polymer particles have a volume average particle size of 0.5 μm or more and 20 μm or less.

[5] The laminated resin film according to any of [1] to [4], wherein the surface layer has an average thickness of 0.2 μm or more and 10 μm or less.

[6] The laminated resin film according to any of [1] to [5], wherein a difference between the volume average particle size of the organic polymer particles and the average thickness of the surface layer is 0.5 μm or more.

[7] The laminated resin film according to any of [1] to [6], wherein a particle size distribution of the organic polymer particles is unimodal, as measured by a Coulter counter method.

[8] The laminated resin film according to any of [1] to [7], wherein the organic polymer particles comprise at least one selected from a (meth)acrylic polymer and a styrenic polymer.

[9] The laminated resin film according to any of [1] to [8], wherein the surface layer is a polyolefin resin layer.

[10] An organic polymer particle serving as an anti-blocking agent comprised in a surface layer of a laminated resin film which comprising a base film layer and the surface layer, wherein a number proportion of the organic polymer particles having a particle size that is at least twice an average thickness of the surface layer is 35% or more of a total number of the organic polymer particles, and wherein a number proportion of the organic polymer particles having a particle size that is at least four times an average thickness of the surface layer is 10% or less of a total number of the organic polymer particles.

[11] The organic polymer particle according to [10], wherein a coefficient of variation of particle size is 20% or more and 50% or less on a volume basis.

[12] The organic polymer particle according to [10] or [11], wherein a volume average particle size is 0.5 μm or more and 20 μm or less.

[13] The organic polymer particle according to any of [10] to [12], wherein a particle size distribution measured by a Coulter counter method is unimodal.

[14] The organic polymer particle according to any of [10] to [13], wherein the organic polymer particle comprises at least one selected from a (meth)acrylic polymer and a styrenic polymer.

[15] A masterbatch, comprising the organic polymer particle according to any of [10] to [14] and a resin for the surface layer.

[16] A method for producing the organic polymer particle according to any of [10] to [14], comprising the steps of subjecting monomers to suspension polymerization in the presence of a dispersion stabilizer.

Effect of the Invention

The laminated resin film of the present invention comprises a base film layer and a surface layer, and the surface layer comprises organic polymer particles serving as an anti-blocking agent. The number proportion of the organic polymer particles having a particle size that is at least twice the average thickness of the surface layer is 35% or more of the total number of the organic polymer particles, and the number proportion of the organic polymer particles having a particle size that is at least four times the average thickness of the surface layer is 10% or less of the total number of the organic polymer particles. As a result, both a reduction in friction of the resin film and suppression of dropping-off of particles from the resin film surface can be achieved.

BRIEF DESCRIPTION OF DRAWINGS

FIG. 1 is a diagram schematically showing a presence form of the organic polymer particles according to the present invention.

FIG. 2 is a scanning electron micrograph image at 500× magnification showing protrusions and a dropping-off trace formed by the organic polymer particles on the surface of a resin film.

MODE FOR CARRYING OUT THE INVENTION

1. Organic Polymer Particle

The laminated resin film of the present invention has a base film layer and a surface layer, and the surface layer contains organic polymer particles (generally referred to as organic polymer fine particles) serving as an anti-blocking agent. The number proportion of the organic polymer particles having a particle size that is at least twice the average thickness of the surface layer is 35% or more of the total number of the organic polymer particles, and the number proportion of the organic polymer particles having a particle size that is at least four times the average thickness of the surface layer is 10% or less of the total number of the organic polymer particles. Therefore, both a reduction in friction of the resin film and suppression of dropping-off of particles from the resin film surface can be achieved. In the present invention, the form of "the surface layer contains organic polymer particles serving as an anti-blocking agent" described above includes the presence form of the organic polymer particles as schematically shown in FIG. 1. In the Form (a) shown in FIG. 1 (a), a part of the organic polymer particle 1 protrudes from the surface of the surface layer 2 on which the base film layer 3 is not laminated, and the rest of the organic polymer particle 1 is in the surface layer 2. In the Form (b) shown in FIG. 1 (b), a part of the organic polymer particle 1 protrudes from the surface of the surface layer 2 on which the base film layer 3 is not laminated, a part of the organic polymer particle 1 sinks in the base film layer 3, and the rest of the organic polymer particle 1 is in the surface layer 2.

In the Form (c) shown in FIG. 1 (c), a part of the organic polymer particle 1 sinks in the base film layer 3, and the rest of the organic polymer particle 1 is in the surface layer 2. In the Form (d) shown in FIG. 1 (d), the organic polymer particle 1 is completely embedded in the surface layer 2. Although one surface layer is formed in FIG. 1, a similar surface layer may be additionally formed so as to sandwich the base film layer between the surface layers.

First, the organic polymer particles and the relationship between the organic polymer particles and the laminated resin film will be described in detail.

The number proportion of the organic polymer particles having a particle size that is at least twice the average thickness of the surface layer is 35% or more, preferably 38% or more, more preferably 50% or more, still more preferably 60% or more, and may be 100% or less, more preferably 90% or less, still more preferably 80% or less, of the total number of the organic polymer particles.

The number proportion of the organic polymer particles having a particle size that is at least four times the average thickness of the surface layer is preferably 10% or less, more preferably 9% or less, still more preferably 7% or less, and may be 1% or more, or 2% or more, of the total number of the organic polymer particles.

The number proportion of the organic polymer particles having a particle size that is at least three times the average thickness of the surface layer is preferably 10% or more, more preferably 12% or more, still more preferably 20% or more, and preferably 60% or less, more preferably 50% or less, still more preferably 40% or less, of the total number of the organic polymer particles.

The surface layer has an average thickness of preferably 0.2 μm or more, more preferably 0.5 μm or more, and preferably 10 μm or less, more preferably 5 μm or less, still more preferably 3 μm or less.

The average thickness of the surface layer can be calculated by SEM (scanning electron microscope) observation. Specifically, the film is embedded in an epoxy resin and polished so that a cross section of the film is exposed, and the cross section is observed with an SEM to measure a thickness of the surface layer. The thickness is measured at positions obtained by evenly dividing the width of the film into three, and the measured values are averaged to determine an average thickness of the surface layer.

A content of the organic polymer particles added to the surface layer is 0.01 mass % or more, preferably 0.05 mass % or more, more preferably 0.1 mass % or more, and 10 mass % or less, preferably 5 mass % or less, more preferably 2 mass % or less, still more preferably 1 mass % or less, in 100 mass % of all components, which include the organic polymer particles, constituting the surface layer.

The organic polymer particles have a volume average particle size of preferably 0.5 μm or more, more preferably 1.0 μm or more, still more preferably 2.0 μm or more, and preferably 20 μm or less, more preferably 15 μm or less, still more preferably 10 μm or less.

The coefficient of variation (CV value) of particle size of the organic polymer particles is a value obtained from a particle size distribution on a volume basis, and is preferably 50% or less, more preferably 45% or less, still more preferably 40% or less, and preferably 20% or more, more preferably 25% or more, particularly preferably 30% or more, on a volume basis.

A ratio of a number average particle size (Dn) to a mass average particle size (Dw) of the organic polymer particles, i.e., (Dn/Dw), is for example, 0.3 or more, preferably 0.4 or more, and may be 0.6 or more. The Dn/Dw is an index of monodispersity of a particle size, indicating that the higher the ratio (Dn/Dw), the smaller the proportion of small particles. As the Dn/Dw approaches 1, particles are monodispersed. The Dn/Dw is, for example, preferably 1 or less, and may be 0.9 or less.

The particle size can be measured by the Coulter counter method with, for example, a precision grain size distribution measuring device adopting the Coulter principle (e.g., "Coulter Multisizer III" manufactured by Beckman Coulter, Inc.). With respect to the measured particle sizes, particle size distributions on a volume basis, a number basis, and a mass basis are determined, and the respective average values of the determined particle size distributions are taken, whereby the volume average particle size (Dv), the number average particle size (Dn), and the mass average particle size (Dw) can be calculated. The coefficient of variation (CV value) of particle size on a volume basis can be calculated according to the following formula.

Coefficient of variation (%) of particle size on a volume basis=(standard deviation $\sigma$ of volume average particle size (Dv)/volume average particle size (Dv))×100

Furthermore, the particle size distribution of the organic polymer particles is preferably unimodal, as measured by the Coulter counter method.

A difference between the volume average particle size of the organic polymer particles and the average thickness of the surface layer is preferably 0.5 µm or more, more preferably 1 µm or more, still more preferably 2 µm or more, and preferably 10 µm or less, more preferably 7 µm or less, still more preferably 5 µm or less.

A moisture content of the organic polymer particles is preferably 3 mass % or less. The moisture content can be measured by the Karl Fischer method.

The organic polymer particles preferably contain at least one selected from a (meth)acrylic polymer and a styrenic polymer, and preferably contain a (meth)acrylic polymer.

The (meth)acrylic polymer may be a homopolymer or a copolymer of a (meth)acrylic monomer, or may be a copolymer of a (meth)acrylic monomer with a monomer other than the (meth)acrylic monomer. The styrenic polymer may be a homopolymer or a copolymer of a styrenic monomer, or may be a copolymer of a styrenic monomer with a monomer other than the styrenic monomer. As for a copolymer of a (meth)acrylic monomer and a styrenic monomer, whether it is a (meth)acrylic polymer, or it is a styrenic polymer is determined based on the higher ratio (weight %) of the monomers.

The (meth)acrylic polymer contains a unit derived from a (meth)acrylic monomer preferably in an amount of 50 mass % or more, more preferably 80 mass % or more, still more preferably 90 mass %. The styrenic polymer contains a unit derived from a styrenic monomer preferably in an amount of preferably 50 mass % or more, more preferably 80 mass % or more, still more preferably 90 mass % or more.

The above (meth)acrylic monomer may be used alone or in combination of two or more, and may be a non-crosslinkable (meth)acrylic monomer or a crosslinkable (meth) acrylic monomer. Examples of the non-crosslinkable (meth) acrylic monomer include (meth)acrylic acid; a monoalkyl (meth)acrylate monomer such as methyl(meth)acrylate, ethyl(meth)acrylate, propyl(meth)acrylate, n-butyl(meth) acrylate, isobutyl(meth)acrylate, t-butyl(meth)acrylate, octyl(meth)acrylate, 2-ethylhexyl(meth)acrylate, dodecyl (meth)acrylate, and stearyl(meth)acrylate; and a monocyclic ether-containing acrylate monomer such as tetrahydrofurfuryl(meth)acrylate.

The crosslinkable (meth)acrylic monomer is required to be a (meth)acrylic monomer having two or more polymerizable functional groups. Examples of such polymerizable functional groups include a vinyl group and a (meth)acryloyl group, and a (meth)acryloyl group is preferable. Examples of a bifunctional crosslinkable (meth)acrylic monomer include an alkane diol di(meth)acrylate such as ethylene glycol di(meth)acrylate, 1,4-butanediol di(meth)acrylate, 1,6-hexanediol di(meth)acrylate, and 1,9-nonanediol di(meth)acrylate; an alkene di(meth)acrylate such as 1,3-butylene di(meth)acrylate; and polyethylene glycol di(meth)acrylate. The number of repeating ethylene glycol units of polyethylene glycol di(meth)acrylate is preferably small from the viewpoints of handleability and hydrophobicity, for example, preferably in the range of 2 to 150, more preferably 2 to 23, still more preferably 2 to 5, and most preferably 2 or 3. Examples of trifunctional or higher functional crosslinkable (meth)acrylic monomers include a trifunctional (meth)acrylate monomer such as trimethylolpropane tri (meth)acrylate; a tetrafunctional (meth)acrylic monomer such as pentaerythritol tetra(meth)acrylate; and a hexafunctional (meth)acrylic monomer such as dipentaerythritol hexa (meth)acrylate.

As the (meth)acrylic monomer, a monoalkyl(meth)acrylate monomer and bi-to hexa-functional (meth)acrylate monomers are preferable, a monoalkyl(meth)acrylate monomer and bi- to tri-functional (meth)acrylate monomers are preferable, and a monoalkyl(meth)acrylate monomer, an alkanediol di(meth)acrylate, and a trifunctional (meth)acrylate monomer are preferable. From the viewpoint of easy formation of the particle, it is particularly preferable to contain methyl(meth)acrylate as the (meth)acrylic monomer.

The styrenic monomer may be used alone or in combination of two or more, and may be a non-crosslinkable styrene monomer or a crosslinkable styrene monomer. Examples of the non-crosslinkable styrene monomer include styrene, o-methyl styrene, m-methyl styrene, p-methyl styrene, $\alpha$-methyl styrene, p-methoxy styrene, p-tert-butyl styrene, p-phenyl styrene, o-chloro styrene, m-chloro styrene, p-chloro styrene and ethyl vinyl benzene. The crosslinkable styrene monomer is required to be a styrenic monomer having two or more polymerizable functional groups. Examples of such polymerizable functional groups include a vinyl group and a (meth)acryloyl group, and a vinyl group is preferable. Examples of the crosslinkable styrene monomer include an aromatic divinyl compound such as m-divinylbenzene, p-divinylbenzene, divinyl naphthalene, and derivatives thereof.

As the styrenic monomer, styrene, m-divinylbenzene and/ or p-divinylbenzene are preferable.

Furthermore, as described above, the organic polymer particle may contain a unit derived from other monomers copolymerizable with the (meth)acrylic monomer, the styrenic monomer, or the like. Examples of the other monomer include a crosslinking agent such as N,N-divinylaniline, divinylether, divinylsulfide and divinylsulfonic acid; polybutadiene; and a reactive polymer disclosed in JP-B-57-56507, JP-A-59-221304, JP-A-59-221305, JP-A-59-221306, JP-A-59-221307, or the like. The amount of the unit derived from the other monomer in the organic polymer particle is preferably 10 mass % or less, more preferably 5 mass % or less, still more preferably 2 mass % or less.

The organic polymer particle preferably contains a unit derived from a crosslinkable monomer. A crosslinkable monomer is a monomer having two or more polymerizable functional groups, and the inclusion of the crosslinkable monomer makes it easy to adjust the mechanical properties of the organic polymer particles. An amount of the unit derived from a crosslinkable monomer (preferably a crosslinkable (meth)acrylic monomer and/or a crosslinkable styrene monomer) in the organic polymer particles is preferably 5 mass % or more, more preferably 10 mass % or more, still more preferably 15 mass % or more, and preferably 35 mass % or less, more preferably 30 mass % or less, still more preferably 25 mass % or less.

In the laminated resin film having the base film layer and the surface layer, the organic polymer particles are added to the surface layer to be used as an anti-blocking agent. The number proportion of the organic polymer particles having a particle size that is at least twice the average thickness of the surface layer is 35% or more of the total number of the organic polymer particles, and the number proportion of the organic polymer particles having a particle size that is at least four times the average thickness of the surface layer is 10% or less of the total number of the organic polymer particles. As a result, both a reduction in friction of the film and suppression of dropping-off of particles from the film surface can be achieved, and hence the organic polymer particles are suitably used as an anti-blocking agent, a slip additive, or the like for various films.

2. Method for Producing Organic Polymer Particles

The above-mentioned organic polymer particles can be produced by subjecting monomers to suspension polymerization in the presence of a dispersion stabilizer.

In the suspension polymerization, first, the monomers are dispersed and suspended in a solvent in the presence of a dispersion stabilizer, to thereby prepare a monomer suspension. The monomers in the monomer suspension thus prepared are polymerized, so that a suspension of the organic polymer particles can be obtained.

The monomer preferably contains at least one selected from the above-mentioned (meth)acrylic monomers and styrene monomers, and may contain the above-mentioned other monomers.

As the dispersion stabilizer, either an organic dispersion stabilizer or an inorganic dispersion stabilizer may be used. Examples of the organic dispersion stabilizer include a water-soluble polymer, an anionic surfactant, a cationic surfactant, a nonionic surfactant, an ampholytic surfactant, alginate, zein, and casein. Examples of the inorganic dispersion stabilizer include barium sulfate, calcium sulfate, barium carbonate, magnesium carbonate, calcium phosphate, talc, clay, diatomaceous earth, bentonite, titanium hydroxide, sodium hydroxide, and a metal oxide powder.

The water-soluble polymer is exemplified by polyvinyl alcohol, gelatin, tragacanth, starch, methyl cellulose, carboxymethyl cellulose, hydroxyethyl cellulose, sodium polyacrylate, and sodium polymethacrylate.

Examples of the anionic surfactant include a fatty acid salt such as sodium oleate and castor oil potassium; an alkyl sulfate ester salt such as sodium lauryl sulfate and ammonium lauryl sulfate; an alkylbenzenesulfonic acid salt such as sodium dodecylbenzenesulfonate; an alkylnaphthalene sulfonic acid salt; an alkanesulfonic acid salt; a dialkylsulfosuccinic acid salt; an alkylphosphoric ester salt; a naphthalenesulfonic acid-formalin condensate; a polyoxyalkylene alkyl ether sulfuric acid salt such as a polyoxyethylene alkyl ether sulfuric acid salt; a polyoxyalkylene aryl ether sulfuric acid ester salt such as polyoxyethylene distyryl phenyl ether sulfate ester ammonium salt and polyoxyethylene phenyl ether sulfuric acid ester salt; and a polyoxyalkylene alkyl sulfuric acid ester salt such as a polyoxyethylene alkyl sulfuric acid ester salt.

Examples of the cationic surfactant include an alkylamine salt such as laurylamine acetate and stearylamine acetate; and a quaternary ammonium salt such as a lauryl trimethyl alkyl ammonium chloride.

Examples of the nonionic surfactant include a polyoxyethylene alkyl ether, a polyoxyethylene alkyl phenyl ether, polyoxyethylene sorbitan-fatty acid ester, sorbitan-fatty acid ester, polyoxy sorbitan-fatty acid ester, a polyoxyethylene alkylamine, glycerol-fatty acid ester, and oxyethylene-oxypropylene block copolymer.

Examples of the amphoteric surfactant include lauryldimethylamine oxide.

From the viewpoints of high polymerization stability and suspension stability, the dispersion stabilizer is preferably an anionic surfactant, and more preferably a polyoxyalkylene aryl ether sulfuric acid salt.

In this step, the dispersion stabilizer is used in an amount of preferably 0.1 parts by mass or more, more preferably 0.5 parts by mass or more, and preferably 5 parts by mass or less, more preferably 3 parts by mass or less, even more preferably 2 parts by mass or less, based on 100 parts by mass of the total amount of the monomers.

As the solvent, an aqueous solvent is preferably used. The aqueous solvent may be water alone or a combination with water and a non-aqueous solvent. From the viewpoint of suspension stability, the solvent preferably contains a sufficient amount of water. Water is contained in an amount of, for example, 80 parts by mass or more, preferably 90 parts by mass or more, more preferably 95 parts by mass or more, and especially preferably 99 parts by mass or more, based on 100 parts by mass of the aqueous solvent.

As the non-aqueous solvent, a water-soluble organic solvent is preferably used. The use of the non-aqueous solvent (particularly, a water-soluble organic solvent) allows a particle size of the resulting particles to be controlled. Examples of the water-soluble organic solvent include an alcohol solvent such as methanol, ethanol, propanol, butanol, 2-methylpropyl alcohol, and 2-methyl-2-propanol; a ketone solvent such as acetone and methyl ethyl ketone; an ester solvent such as ethyl acetate; and an ether solvent such as dioxane, diethyl ether, and tetrahydrofuran.

In the monomer suspension, the amount of the solvent is, based on 100 parts by mass of a solid content (components in which a solvent is removed from a monomer suspension), preferably 100 parts by mass or more, more preferably 120 parts by mass or more, still more preferably 135 parts by mass or more, and preferably 1000 parts by mass or less, more preferably 700 parts by mass or less, still more preferably 500 parts by mass or less. The solvent may be mixed at once before dispersion (suspension), or may be mixed dividedly before and after dispersion (suspension).

As a polymerization initiator used in the suspension polymerization, a radical polymerization initiator is preferable. As the radical polymerization initiator, a thermal polymerization initiator is preferable, and, for example, a peroxide polymerization initiator and an azo compound polymerization initiator may be used. Among these, a peroxide polymerization initiator is preferable. Examples of the peroxide polymerization initiator include a peroxide having a structure represented by C(O)OOC(O), such as benzoyl peroxide, lauryl peroxide, octanoyl peroxide, orthochloro benzoyl peroxide, o-methoxy benzoyl peroxide, and diisopropyl peroxydicarbonate; a peroxide having a structure represented by COOC, such as cyclohexanone peroxide, t-hexyl peroxy-2-ethylhexanoate (trade name: PERHEXYL® O), and 1,1-di(t-hexylperoxy)cyclohexane (trade name: PERHEXA® HC); a peroxide having a structure represented by COOH, such as cumene hydroperoxide and t-butyl hydroperoxide; a dimeric ketone peroxide such as methyl ethyl ketone peroxide; and diisopropylbenzene hydroperoxide. Examples of the azo compound polymerization initiator include 2,2'-azobisisobutyronitrile, 2,2'-azobis(2,4-dimethylvaleronitrile), 2,2'-azobis(2,3-dimethylbutyronitrile), 2,2'-azobis-(2-methylbutyronitrile), 2,2'-azobis(2,3,3-trimethylbutyronitrile), 2,2'-azobis(2-isopropylbutyronitrile), 1,1'-azobis (cyclohexane-1-carbonitrile), 2,2'-4-methoxy-2,4-dimethylvaleronitrile), 2-(carbamoylazo)isobutyronitrile, 4,4'-azobis(4-cyanovaleric acid), and dimethyl-2,2'-azobis isobutyrate.

A polymerization initiator having a ten-hour half-life temperature in the range of 40 to 90° C., preferably 40 to 80° C., more preferably 50 to 70° C. is preferably used. When the ten-hour half-life temperature of the polymerization initiator is within the above range, the polymerization reaction is easily controlled and the polymerization initiator is also easily removed by a temperature rise. Specific examples of such a polymerization initiator include lauryl peroxide (ten-hour half-life temperature: 61.6° C.).

An amount of the polymerization initiator is preferably 2.5 parts by mass or less, more preferably 2 parts by mass or less, still more preferably 1.5 parts by mass or less, and preferably 0.1 parts by mass or more, more preferably 0.3 parts by mass or more, still more preferably 0.5 parts by mass or more, based on 100 parts by mass of the total amount of the monomers.

In the suspension polymerization, an antioxidant may coexist. Examples of the antioxidant include a hindered phenol antioxidant, a sulfur antioxidant, a thiol compound, a phosphorus antioxidant, a lactone antioxidant, a hydroxyamine antioxidant, a vitamin E antioxidant. Among these, a hindered phenol antioxidant is preferable.

Specific examples of the hindered phenol antioxidant include pentaerythritol tetrakis[3-(3,5-di-tert-butyl-4-hydroxyphenyl)propionate] (trade name: IRGANOX® 1010), octadecyl-3-(3,5-di-tert-butyl-1-hydroxyphenyl)propionate, N,N'-hexane-1,6-diyl bis[3-(3,5-di-tert-butyl-4-hydroxyphenyl)propionamide], benzenepropanoic acid, 3,5-bis(1,1-dimethylethyl)-4-hydroxy, C7-C9 side chain alkyl ester, 3,3',3'',5,5',5''-hexa-tert-butyl-a,a',a''-(mesitylene-2,4,6-triyl)tri-p-cresol, calcium diethylbis[[[3,5-bis(1,1-dimethylethyl)-4-hydroxyphenyl]methyl]phosphonate], ethylenebis (oxyethylene)bis[3-(5-tert-butyl-4-hydroxy-m-tolyl) propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H, 5H)-trione, 1,3,5-tris[(4-tert-butyl-3-hydroxy-2,6-xylyl)methyl]-1,3,5-triazine-2,4,6(1H,3H,5H)-trione, a reaction product of N-phenyl-benzenamine with 2,4,4-trimethylbenzene, diethyl[[3,5-bis(1,1-dimethylethyl)-4-hydroxyphenyl] methyl]phosphonate, 2,4-dimethyl-6-(1-methylpentadecyl) phenol, octadecyl-3-(3,5-tert-butyl-4-hydroxyphenyl)propionate, and 2',3-bis[3-(3,5-di-tert-butyl-4-hydroxyphenyl) propionyl]propionic acid hydrazide.

An amount of the antioxidant may be, for example, 0.2 parts by mass or more, preferably 0.3 parts by mass or more, more preferably 0.4 parts by mass or more, and may be, for example, 5 parts by mass or less, preferably 3 parts by mass or less, more preferably 2 parts by mass or less, based on 100 parts by mass of the total amount of the monomers.

The addition order of the monomer, the dispersion stabilizer, the solvent, the polymerization initiator, the antioxidant, and the like is not particularly restricted. It is preferable that for example, first, the solvent and the dispersion stabilizer be mixed, and the monomer, the polymerization initiator, and the antioxidant be then mixed. It is also preferable that the polymerization initiator and the antioxidant be dissolved beforehand in the monomer.

In the dispersion and suspension of the monomer, the polymerization initiator, the antioxidant, the solvent, the dispersion stabilizer, and the like, an emulsion dispersing device can be used. Examples of the emulsion dispersing device include a high-speed shearing disperser of turbine type such as Milder (manufactured by Ebara Corporation) and T. K. Homogenizing Mixer (manufactured by Primix Corporation); a high-pressure jet homogenizer such as a piston-type high-pressure homogenizer (manufactured by Gaulin Corporation) and Microfluidizer (manufactured by Microfluidics Corporation); an ultrasonic type emulsion disperser such as Ultrasonic Homogenizer (manufactured by NIHONSEIKI KAISHA LTD.); a media-agitation type disperser such as Attritor (manufactured by Mitsui Mining Co., Ltd.); and a forcible gap passage type disperser such as Colloid Mill (manufactured by NIHONSEIKI KAISHA LTD.). Before the dispersion and suspension, preliminary agitation may be performed with a usual paddle blade or the like.

An agitation speed during the dispersion and suspension is, from the viewpoint of controlling a particle size, preferably 3000 rpm or more, more preferably 4000 rpm or more in the case of using, for example, T. K. Homogenizing Mixer MARK II model 2.5 (manufactured by Primix Corporation). An agitation time is, from the viewpoint of controlling a particle size, preferably in the range of 5 to 50 minutes in the case of using the above-mentioned T. K. Homogenizing Mixer MARK II model 2.5. When the agitation time is within the above range, an increase of a liquid temperature can be prevented, and then a polymerization reaction can be easily controlled.

A polymerization temperature is preferably in the range of 40 to 100° C., more preferably 50 to 90° C. The polymerization temperature can be appropriately adjusted depending on the type of polymerization initiator to be used, and is, for example, preferably higher by 2 to 4° C. than a ten-hour half-life temperature of the polymerization initiator to be used. The ten-hour half-life temperature is a measure of a temperature at which a polymerization initiator decomposes. When the polymerization temperature is within the above range, the decomposition of the polymerization initiator suitably proceeds. As a result, a residual amount of the polymerization initiator in the resulting particle is reduced, and at the same time, good polymerization stability is achieved. In particular, in the case where lauryl peroxide (ten-hour half-life temperature: 61.6° C.) is used as a polymerization initiator, a polymerization temperature is preferably in the range of 64 to 66° C.

A polymerization time is preferably in the range of 5 to 600 minutes, more preferably 10 to 300 minutes. When the polymerization time is within the above range, the degree of polymerization is properly increased, so that the mechanical properties of the particles can be enhanced. A polymerization atmosphere is preferably an inert atmosphere such as nitrogen atmosphere, noble gas atmosphere, or the like.

The resulting suspension of the organic polymer particles is cooled to a temperature of 50° C. or lower, and then subjected to solid-liquid separation, so that the organic polymer particles are collected. As a solid-liquid separation method, a suitable method can be selected from filtration, centrifugal separation, and a combination thereof, and if necessary, a flocculant may be used.

The organic polymer particles thus obtained are preferably dried. A drying temperature is preferably 60° C. or higher, more preferably 70° C. or higher, and preferably 90° C. or lower. A drying time is preferably 10 hours or more and 20 hours or less, more preferably 12 hours or more and 18 hours or less. The longer drying time is, the easier it is for particles to dry. A shorter drying time can prevent particles from being colored.

Further, the dried organic polymer particles may be disintegrated as required. The disintegration may be preferably performed at a temperature of 10 to 40° C. by preferably applying a pulverizing pressure of 0.1 to 0.5 MPa.

The organic polymer particles may be classified as required in order to control a particle size. Either wet classification or dry classification can be adopted to classify the particles, and the dry classification is preferable. The wet classification can be performed, for example, by letting a polymerized polymeric liquid pass through a metallic mesh. In the dry classification, polymerized particles are further dried and pulverized, and then can be subjected to the dry classification by using an appropriate classification device (for example, an air current-type classification device).

3. Masterbatch

The use of the organic polymer particles allows both a reduction in friction of the film and suppression of dropping-off of particles from the film surface to be achieved. The organic polymer particles are useful as an additive for resin and may be mixed with a resin to prepare a masterbatch. By processing the organic polymer particles into a masterbatch, the amount of the organic polymer particles in a resin composition or a resin film (especially a surface layer of the resin film) to be obtained can be easily adjusted. As a result, the organic polymer particles can be more homogeneously dispersed to prevent segregation of the organic polymer particles.

As a resin to be used in the masterbatch, a resin categorized as a thermoplastic resin can be used. Examples of the thermoplastic resin include polyester resin; polyolefin resin; polyamide resin; polyurethane resin; (meth)acrylic resin; polycarbonate resin; and polystyrene resin. Among these, polyolefin resin is preferable. As the polyolefin resin, polyethylene, polypropylene, poly(4-methylpentene) or the like may be used, and polypropylene is preferably used. The polypropylene resin mainly includes a homopolymer, that is, polypropylene; and a random polymer in which propylene (preferably 95 mass % or more) and a small amount (preferably 5 mass % or less) of ethylene are copolymerized. The term "polypropylene resin" used in the specification includes the homopolymer; and a propylene copolymer such as the propylene-ethylene random polymer. The propylene copolymer improves the physical properties of the homopolymer. Among these, a polypropylene resin in which the proportion of a unit derived from propylene is preferably 90 mass % or more, more preferably 95 mass % or more is preferable.

An amount of the resin in the masterbatch is preferably 50 mass % or more, more preferably 70 mass % or more, even more preferably 80 mass % or more, particularly preferably 85 mass % or more, and preferably 99 mass % or less, more preferably 95 mass % or less.

A content of the organic polymer particles in the masterbatch, based on 100 parts by mass of the masterbatch, is preferably 0.1 part by mass or more, more preferably 1 part by mass or more, even more preferably 5 parts by mass or more, and preferably 100 parts by mass or less, more preferably 50 parts by mass or less, even more preferably 20 parts by mass or less, still more preferably 15 parts by mass or less.

The masterbatch preferably further contains an antioxidant. Examples of the antioxidant include a hindered phenol antioxidant, a sulfur antioxidant, a thiol compound, a phosphorus antioxidant, a lactone antioxidant, a hydroxyamine antioxidant, a vitamin E antioxidant. Among these, a hindered phenol antioxidant and a phosphorus antioxidant are preferable.

The hindered phenol antioxidant can be selected from those exemplified above.

As the phosphorus antioxidant, tris(2,4-di-tert-butylphenyl)phosphite, tris[2-[[2,4,8,10-tetra-tert-butyldibenzo[d,f][1,3,2]dioxaphosphephin-6-yl]oxy]ethyl]amine, bis(2,4-di-tert-butylphenyl)pentaerythritol diphosphate, bis[2,4-bis(1,1-dimethylethyl)-6-methylphenyl]ethyl ester phosphorous acid, and tetrakis(2,4-di-tert-butylphenyl)[1,1-biphenyl]-4,4'-diylbis phosphonate are exemplified.

In particular, a total amount of the hindered phenol antioxidant and the phosphorus antioxidant is preferably 80 mass % or more, more preferably 90 mass % or more, even more preferably 95 mass % or more, particularly preferably 98 mass % or more, in the antioxidant. The hindered phenol antioxidant is contained in an amount of preferably 20 to 80 mass %, more preferably 30 to 70 mass %, even more preferably 40 to 60 mass %, in the antioxidant.

Furthermore, an amount of the antioxidant, based on 100 parts by mass of a resin in the masterbatch, is preferably 0.1 parts by mass or more, more preferably 0.5 parts by mass or more, even more preferably 0.8 parts by mass or more, and preferably 7 parts by mass or less, more preferably 4 parts by mass or less, even more preferably 2 parts by mass or less, particularly preferably 1.5 parts by mass or less.

As a method for preparing the masterbatch, for example, a method of adding and mixing polymer particles in a polymerization stage for synthesis of a resin; a method of melting and mixing a polymerized resin using an extruder or the like; or a method of adding and mixing polymer particles in a state where a resin is dissolved in a solvent may be used. Among these, the method of melting and mixing is preferable since a resin composition containing the organic polymer particles dispersed at a high concentration is easily prepared by the method.

The prepared masterbatch is usually processed into a powder form or a pellet form.

4. Laminated Resin Film and Resin Composition

The laminated resin film is composed of a base film layer and a surface layer containing the organic polymer particles. Using the organic polymer particles, it is possible to obtain a laminated resin film in which both a reduction in friction of the film and suppression of dropping-off of the particles from the film surface can be achieved.

The laminated resin film has preferably at least one surface layer, and has more preferably two surface layers, each of the surface layers being laminated on both surfaces of the base film layer.

Resins (matrix resins) used in the base film layer and the surface layer are selected from those exemplified as a resin to be used in the above-mentioned masterbatch. The matrix resins used in the base film layer and the surface layer may be the same or different, and are preferably the same. When producing the laminated resin film after processing into a masterbatch, the matrix resin may be the same as or different from the resin used in the masterbatch. The base film layer may or may not contain organic polymer particles.

In particular, from the viewpoints of productivity and processability, the base film layer and the surface layer (matrix resin layer) are preferably a polyolefin resin layer, more preferably a polypropylene resin layer, even more preferably a polypropylene resin layer containing a unit derived from propylene in an amount of preferably 90 mass % or more, more preferably 95 mass % or more, and particularly preferably a homopolymer layer consisting only of polypropylene.

In the laminated resin film, an average thickness of the surface layer is preferably 0.2 μm or more, more preferably 0.5 μm or more, and preferably 10 μm or less, more preferably 5 μm or less, still more preferably 3 μm or less.

In the laminated resin film, a ratio of the average thickness of the base film layer to the average thickness of the surface layer (i.e., thickness of base film layer/thickness of surface layer) is preferably 2 or more, more preferably 10 or more, still more preferably 15 or more, and preferably 50 or less, more preferably 30 or less, still more preferably 20 or less.

An average thickness of the laminated resin film in which the base film layer and the surface layer are laminated (including an unstretched laminated resin film and a stretched laminated resin film) is preferably 5 μm or more, more preferably 10 μm or more, still more preferably 15 μm or more, and preferably 1 mm or less, more preferably 500 μm or less, still more preferably 400 μm or less. The average thickness of the laminated resin film can be measured with a micrometer.

In the laminated resin film using the organic polymer particles, dropping-off of the organic polymer particles is suppressed. The amount of particles dropped off from the laminated resin film can be quantitatively evaluated from the product of the number of dropped particles and the average volume of dropped particles, and can be calculated, for example, based on the following formula. In the formula, the "$r_k$" represents a particle radius of an organic polymer particle (k) dropped off from the laminated resin film in the following particle dropping-off test, and the "n" represents the number of dropped particles whose particle radii have been measured, and is 300 or more.

$$\text{Volume of dropped particles per 1 mm}^2 \text{ of surface of laminated resin film (μm}^3/\text{mm}^2) = \sum_{k=1}^{n}\left(\frac{4}{3}\pi r_k^3\right)/n \times \text{Number of dropped particles per 1 mm}^2 \text{ of surface of laminated resin film}$$

[Equation 1]

[Particle Dropping-Off Test]

A laminated resin film is fixed to a 200 g-weight having a bottom width of 63.5 mm and a bottom length of 63.5 mm. The weight with the polypropylene film fixed is placed on a measurement base where a laminated resin film is fixed to the upper surface so that the surface layers of these laminated resin films are in contact with each other. Thereafter, the weight is repeatedly slid in the same direction at a rate of 150 mm/min. An area where the weight has been slid 20 times is determined as a measuring area.

In the case where the laminated resin film after the following friction test is observed with a scanning electron microscope at 500× magnification, the number of dropped particles per 1 mm² of the surface of the laminated resin film is a value obtained by counting the number of dropping-off traces of particles contained in an area of 270 μm×200 μm and averaging the counted numbers of dropping-off traces of particles for 25 areas. The dropping-off traces of the organic polymer particles are distinguishable from protrusions formed by the organic polymer particles as shown in FIG. 2.

[Friction Test]

A laminated resin film is fixed to a 200 g-weight having a bottom width of 63.5 mm and a bottom length of 63.5 mm. The weight with the laminated resin film fixed is placed on a measurement base where a laminated resin film is fixed to the upper surface so that the surface layers of these laminated resin films are in contact with each other. Thereafter, the weight is slid in the same direction at a rate of 150 mm/min. An area where the weight has been slid 20 times is determined as a measuring area.

It should be noted that there may be a difference in the degree of crystal growth between both surfaces of the laminated resin film. When there is a difference in smoothness between the surfaces, a smoother surface having less crystal growth is used in the friction test.

In the laminated resin film, the volume of dropped particles per 1 mm² of the surface of the surface layer containing the organic polymer particles is preferably 2000 μm³/mm² or less, more preferably 1800 μm³/mm² or less, still more preferably 1600 μm³/mm² or less, and may be 500 μm³/mm² or more.

The coefficient of dynamic friction ($\mu_k$) of the surface layer containing the organic polymer particles of the laminated resin film is preferably 0.2 or less, more preferably 0.15 or less, still more preferably 0.12 or less, and may be, for example, 0.01 or more.

A ratio of the volume average particle size of the organic polymer particles to the average thickness of the surface layer of the laminated resin film (i.e., volume average particle size of organic polymer particles/thickness of surface layer) is preferably 1.5 or more, more preferably 2 or more, still more preferably 2.5 or more, and preferably 10 or less, more preferably 7 or less, still more preferably 5.5 or less.

When the laminated resin film is produced, the organic polymer particles are, directly or after processed into the above-mentioned masterbatch, mixed (preferably melted and mixed) with a resin at the above-mentioned proportion to dilute the masterbatch, thereby to obtain a resin composition for the surface layer. The laminated resin film can be produced by molding the resin composition for the surface layer together with the resin for the base film layer. In the molding of the resin composition, it is preferable that the resin composition be melt extruded to produce an unstretched film (i.e., cast film) and this unstretched film be stretched to produce a stretched film.

In the case of using the masterbatch, an amount of the resin used for dilution is preferably 2 parts by mass or more and 200 parts by mass or less, more preferably 3 parts by mass or more and 150 parts by mass or less, even more preferably 5 parts by mass or more and 100 parts by mass or less, based on 1 part by mass of the masterbatch.

As a method of mixing organic polymer particles with the resin and molding the resin composition, a melt extrusion molding method such as a T-die method is preferable. In the case where the surface layer and the base film layer are laminated to produce the laminated resin film, co-extrusion may be performed. When the co-extrusion is performed, a melting temperature is preferably in the range of 180 to 240° C., more preferably in the range of 200 to 220° C.

The unstretched laminated resin film has an average thickness of, for example, preferably 100 μm or more and 1 mm or less, more preferably 200 µm or more and 500 µm or less, still more preferably 250 µm or more and 400 µm or less.

A stretching axis at the time of stretching the unstretched film (cast film) may be uniaxial or biaxial, and is preferably biaxial. In the case of biaxial stretching, sequential biaxial stretching or simultaneous biaxial stretching may be performed. A stretch ratio is preferably 1 to 5 times, more preferably 2 to 4 times in both vertical and horizontal axes.

The stretched laminated resin film has an average thickness of preferably 5 µm or more, more preferably 10 µm or more, still more preferably 15 µm or more, and preferably 100 µm or less, more preferably 50 µm or less, still more preferably 30 µm or less.

The laminated resin film of the present invention has a base film layer and a surface layer, and the surface layer contains organic polymer particles serving as an anti-blocking agent. The number proportion of the organic polymer particles having a particle size that is at least twice the average thickness of the surface layer is 35% or more of the total number of the organic polymer particles, and the number proportion of the organic polymer particles having a particle size that is at least four times the average thickness of the surface layer is 10% or less of the total number of the organic polymer particles. Therefore, the anti-blocking property is appropriately imparted to the laminated resin film. The above-described laminated resin film is suitably used as general packaging materials, food packaging materials such as food packaging film, and pharmaceutical packaging materials such as pharmaceutical packaging film.

The present application claims the benefit of the priority date of Japanese patent application No. 2016-158146 filed on Aug. 10, 2016. The entire contents of the specification of Japanese patent application No. 2016-158146 filed on Aug. 10, 2016 are incorporated herein by reference.

EXAMPLE

Hereinafter, the present invention is described in more detail with Examples. The present invention is, however, not restricted to the following Examples in any way, and it is possible to work the present invention according to the Examples with an additional appropriate change within the range of the above descriptions and the following descriptions. Such a changed embodiment is also included in the technical scope of the present invention. The following "part" is "part by mass" and "%" is "mass %" unless otherwise noted.

Various measurements and evaluations were carried out according to the following methods.

Measurements of Volume Average Particle Size, Number-Average Particle Size, Mass-Average Particle Size, Coefficient of Variation of Particle Size (on a Volume Basis), and Number Proportion of Particles Into 0.5 g of a surfactant ("NEOPELEX® G15", sodium dodecylbenzene sulfonate, manufactured by Kao Corp.), 0.1 g of organic polymer particles were dispersed to obtain a dispersed viscous liquid. Then, 15 g of deionized water was added to the obtained dispersed viscous liquid. Thereafter, ultrasonic wave was applied to the mixture to prepare an organic polymer particle dispersion in a state in which the organic polymer particles are dispersed. Using a precision grain size distribution measuring device ("Coulter Multisizer III" manufactured by Beckman Coulter, Inc., aperture: 50 µm), particle sizes of 100,000 particles were measured, and average particle sizes (on a volume basis, on a number basis, and on a mass basis) and a coefficient of variation of the particle size (on a volume basis) were determined.

Coefficient of variation of particle size (on a volume basis) (%)=(σ/d50)×100 wherein the "σ" represents a standard deviation of the particle size, and the "d50" represents an average particle size on a volume basis.

Furthermore, with respect to 100,000 particles whose particle sizes were measured, the number of particles having a particle size of 2 µm or more and the number of particles having a particle size of 4 µm or more were measured, each of the numbers was divided with the total number (100,000) of measured particles and then multiplied with 100 to calculate a number proportion. Measurement of the particle size was conducted in the range of 1 µm to 30 µm.

Measurement of Coefficient of Friction (COF)

The smoother surface of a biaxially stretched laminated resin film (BOPP) was used as a surface to be measured, and Autograph AG-X manufactured by Shimadzu Corporation was used as a friction coefficient measurement device. As jigs for measuring a coefficient of friction, a load cell having a capacity of 50 N, a specialized measurement base (200 mm in width×355 mm in length), and a moving weight (size: 68.5 mm in width×63.5 mm in length×6.4 mm in thickness, mass: 200 g) were used.

The peripheries of two (one pair) biaxially stretched laminated resin films were cut away to prepare a film of 12 cm×18 cm and a film of 12 cm×12 cm film. The film cut in a size of 12 cm×18 cm was fixed to the measurement base so that the roll face side, which is a surface for measuring friction resistance, of the film faces upward, and then four corners of the sample were secured with cellophane tape. The film cut in a size of 12 cm×12 cm was used to wrap the moving weight so that the roll face side of the film was on the outside, and was fixed to the weight with cellophane tape.

The moving weight wrapped with the sample (film) was placed on the sample (film) on the measurement base, the moving weight was repeatedly slid in the same direction using a crosshead (rate: 150 mm/min, travel distance at a time: 100 mm), and travel resistance caused by friction during this travel was measured. A coefficient of dynamic friction was determined from a resistance (dynamic frictional resistance) at a point where a distance from the movement starting point of the weight is in the range of 30 mm to 90 mm and a travel resistance is balanced Coefficient of dynamic friction ($\mu_k$)=average tensile test force during travel of moving weight/(mass of moving weight×acceleration of gravity)

The weight was traveled four times, and the average of the coefficients of dynamic friction at all times was regarded as the coefficient of dynamic friction of the film.

A case where the coefficient of dynamic friction was 0.2 or less was judged as "good", and a case where the coefficient of dynamic friction was more than 0.2 was judged as "poor".

Measurement of Volume of Dropped Particles

In the same manner as in the above-described measurement of the coefficient of dynamic friction except that the weight was traveled 20 times, the weight wrapped with the film was traveled on the film fixed on the measurement base. Then, dropped particles adhering to the friction surface of the sample (film) fixed to the moving weight and the friction surface of the sample (film) fixed to the measurement base were washed away with methanol, and the methanol was concentrated to dryness, thereby to collect the dropped off particles in the methanol. The collected dropped particles were observed with an SEM (scanning electron microscope, VK-8500 manufactured by Keyence Corporation), and the particle sizes of the observed particles were measured using calipers. To ensure the reliability of measurement values, 300 or more particles were measured. Based on the measured particle sizes, a particle volume per dropped particle ($(4/3)\times$(particle radius)$^3$) and the average value thereof was determined.

Measurement of Number of Dropped Particles by SEM Measurement

The film (on the measurement base side) after washing with methanol to collect dropped particles was dried, and then the film surface was observed with a SEM (acceleration voltage: 5 kV, secondary electron image). An observation magnification was set to 500 times, and while shifting an observation location so that a region of 270 μm×200 m in one field of view should not overlap, images in 25 fields of view were taken. The number of particles (i.e., the number of protrusions formed by the organic polymer particles) and the number of dropped particles (i.e., dropping-off traces of particles) contained in each of the taken images were counted respectively, and each of the counted numbers was divided by the view area of measurement to obtain the number of dropped particles per 1 mm$^2$ of surface of the laminated resin film. The number of dropped particles can be easily counted based on the dropping-off traces in the SEM images (FIG. 2).

From the number of dropped particles obtained, the volume of the dropped particles per 1 mm$^2$ of surface of the laminated resin film was calculated based on the following formula. In the formula, the "n" represents the number of dropped particles whose particle radii were measured, and the "$r_k$" represents the particle radius of each particle.

A case where the volume of dropped particles was 2,000 μm$^3$/mm$^2$ or less was judged as "good", and a case where the volume of dropped particles exceeded 2,000 μm$^3$/mm$^2$ was judged as "poor".

Volume of dropped particles per 1 mm$^2$ of surface of laminated resin film (μm$^3$/mm$^2$) = [Equation 2]

$$\sum_{k=1}^{n}\left(\frac{4}{3}\pi r_k^3\right)\Big/n\times \text{Number of dropped particles}$$

per 1 mm$^2$ of surface of laminated resin film

Example 1

Preparation of Organic Polymer Particles

A flask equipped with an agitator, an inert gas inlet tube, a reflux condenser and a thermometer was charged with 523 parts of deionized water in which 3.6 parts of polyoxyethylene distyryl phenyl ether sulfate ester ammonium salt (trade name "HITENOL® NF-08", manufactured by Daiichi Kogyo Seiyaku Co., Ltd.) had been dissolved. The flask was then charged with a mixture of 324 parts of methyl methacrylate and 36 parts of trimethylolpropane trimethacrylate (TMPTMA) as monomers, 3.6 parts (i.e., 1 mass % relative to the mass of the monomers) of lauroyl peroxide (LPO) as a polymerization initiator, and 1.8 parts (i.e., 0.5 mass % relative to the monomers) of a hindered phenol antioxidant (manufactured by BASF Japan, trade name "IRGANOX® 1010" and pentaerythritol tetrakis[3-(3,5-di-tert-butyl-4-hydroxyphenyl)propionate]) as an antioxidant, which were prepared in advance. The charged mixture was agitated at 5000 rpm for 10 minutes using a T. K. Homogenizer (manufactured by Tokushu Kika Kogyo Co., Ltd.) to give a homogeneous monomer suspension.

Into the monomer suspension, 900 parts of deionized water was added, and the mixture was then heated until the temperature of the reaction solution reached 65° C. while nitrogen gas was blown thereinto. A reaction container was kept at 65° C., and the reaction start time was determined at a time when the temperature exceeded 75° C. and reached its peak by self-heating. After the reaction started, the reaction solution was agitated at this temperature for 1.5 hours, and then, the polymeric liquid was further heated to 85° C. and agitated for 2 hours to complete the polymerization reaction. Thereafter, the reaction solution (suspension) was cooled and filtered to take out a polymerization product. Using a hot air dryer (manufactured by Yamato Scientific Co., Ltd.), the polymerization product was dried at 85° C. for 15 hours or more to obtain organic polymer particles.

Since the dried organic polymer particles thus obtained were flocculated due to drying, they were pulverized under a pulverization pressure of 0.3 MPa at room temperature using Super Jet Mill SJ-500 (manufactured by NISSHIN ENGINEERING INC.). In addition, in order to remove coarse particles from the pulverized particles, a classification treatment was carried out using TC-15 (manufactured by NISSHIN ENGINEERING INC.).

The classification conditions were set to a rotation speed of 10000 rpm and an air flow rate of 3 m$^3$/min, and fine powders from which coarse particles had been removed were collected by cyclone collection.

Preparation of Film

Using a same-direction rotating biaxial kneading extruder ((HK-25D) manufactured by Parker Corporation), 10 parts of the organic polymer particles thus produced, 90 parts of pellets of polypropylene (NOVATEC® FY4 manufactured by Japan Polypropylene Corporation), and 0.5 parts of IRGANOX® 1010 and 0.5 parts of IRGAFOS® 168 as antioxidants were melted and mixed at 212° C., and then cooled with water to give a strand. The strand was appropriately cut to prepare a polypropylene masterbatch containing 10% of the organic polymer particles.

Using the polypropylene masterbatch thus obtained and the pellet of polypropylene, a three-layered cast film composed of two kind of materials was prepared. A configuration in which a surface layer was laminated on both sides of a base film layer was adopted. A T-die extrusion molding machine (manufactured by SOUKEN co., Ltd.) was used for the film preparation. In the two surface layers, 1 part of the masterbatch containing 10% of the organic polymer particles and 9 parts of the pellet of polypropylene were used. In the base film layer, 180 parts of pellet of polypropylene alone were used. In the cast film, each of the two surface layers had an average thickness of 16 μm, the base film layer had an average thickness of 288 μm, and the total average thickness of the two surface layers and the base film layer was 320 μm.

The cast film thus obtained was cut into a piece having a length of 9 cm and a width of 9 cm. The cut film piece was subjected to simultaneous biaxial stretching under heating conditions of 165° C. with the stretch ratio set to 3 times in longitudinal and lateral directions using a simultaneous biaxial stretching machine (manufactured by Toyo Seiki Seisaku-sho, Ltd.). The obtained film had a size of 22 cm×22 cm. The center portion of the stretched film had an average thickness of 20 μm, whereas the film end portion had a thickness of 100 μm or so. A 12 cm×12 to 18 cm portion in the center of the film had a thickness of about 20 μm as an average thickness of the entire film. This center portion was used for various tests. In the obtained biaxially stretched film, each of the two surface layers had an average thickness of 1 μm, and the base film layer had an average thickness of 18 μm.

The average thickness of the entire film was calculated by further cutting out the center portion (10 cm×10 cm) of the cut film piece, measuring the thickness of the cut out film three times or more with a micrometer (model: MDC-25M, manufactured by Mitutoyo Corporation), and taking the average value thereof. The average thickness of the surface layer was calculated in the following manner. The film was embedded in an epoxy resin and polished so that a cross section of the film was exposed, and the cross section was observed with an SEM (scanning electron microscope). The thickness was measured at positions obtained by evenly dividing the width of the film into three, and the measured thicknesses were averaged to calculate an average thickness of the surface layer.

It should be noted that a film molded by the T-die extrusion molding machine is wound up when a cast film is prepared, and crystal growth of polypropylene on a side (roll side) of the film to be in contact with a winding roll can be suppressed more sufficiently than crystal growth on the other side (air side) of the film because a cooling speed on the roll side is generally higher than a cooling speed on the air side, so that the surface of the finished cast film is smooth. On the other hand, crystal growth of polypropylene tends to occur on the air side, so that the air side obtains a rough surface as compared with the roll side.

Example 2

Organic polymer particles were prepared in the same manner as in Example 1, except that the conditions of TC-15 in the cyclone collection of fine powders were changed to a rotation speed of 11000 rpm and an air flow rate of 3 m³/min. A film was produced in the same manner as in Example 1.

Example 3

Organic polymer particles were prepared in the same manner as in Example 1, except that 288 parts of methyl methacrylate and 72 parts of ethylene glycol dimethacrylate were used instead of 324 parts of methyl methacrylate and 36 parts of trimethylolpropane trimethacrylate (TMPTMA) as monomers, except that the agitation using a T. K. Homogenizer (manufactured by Tokushu Kika Kogyo Co., Ltd.) was performed at 5500 rpm for 40 minutes instead of at 5000 rpm for 10 minutes, and except that the cyclone collection by TC-15 was not performed. A film was produced in the same manner as in Example 1.

Example 4

Organic polymer particles were prepared in the same manner as in Example 3, except that the agitation using a T. K. Homogenizer (manufactured by Tokushu Kika Kogyo Co., Ltd.) was performed at 5700 rpm for 40 minutes instead of at 5500 rpm for 40 minutes. A film was produced in the same manner as in Example 1.

Comparative Example 1

Organic polymer particles were prepared in the same manner as in Example 1, except that the cyclone collection by TC-15 was not performed. A film was produced in the same manner as in Example 1.

Comparative Example 2

Organic polymer particles were prepared in the same manner as in Comparative Example 1, except that the agitation using a T. K. Homogenizer (manufactured by Tokushu Kika Kogyo Co., Ltd.) was performed at 6000 rpm for 30 minutes instead of at 5000 rpm for 10 minutes. A film was produced in the same manner as in Example 1.

Comparative Example 3

Organic polymer particles were prepared in the same manner as in Example 1, except that the conditions of TC-15 in the cyclone collection were changed to a rotation speed of 7000 rpm and an air flow rate of 3 m³/min. A film was produced in the same manner as in Example 1.

Comparative Example 4

Organic polymer particles were prepared in the same manner as in Example 1, except that 288 parts of methyl methacrylate and 72 parts of ethylene glycol dimethacrylate were used instead of 324 parts of methyl methacrylate and 36 parts of trimethylolpropane trimethacrylate (TMPTMA) as monomers, except that the agitation using a T. K. Homogenizer (manufactured by Tokushu Kika Kogyo Co., Ltd.) was performed at 5500 rpm for 23 minutes instead of at 5000 rpm for 10 minutes, and except that the cyclone collection by TC-15 was not performed. A film was produced in the same manner as in Example 1.

With respect to the obtained organic polymer particles, the average particle size, the coefficient of variation, the ratio of the average particle size (Dn/Dw), the number proportion of the organic polymer particles each having a particle size that is at least twice, at least three times, and at least four times the average thickness of the surface layer of the biaxially stretched laminated resin film, the coefficient of dynamic friction of the film, and the volume of dropped particles after the friction test are shown in Table 1.

TABLE 1

| | | | | Examples | | | |
|---|---|---|---|---|---|---|---|
| | | | | 1 | 2 | 3 | 4 |
| Production conditions of particles | Monomer | MMA | part | 324 | 324 | 288 | 288 |
| | | EGDMA | part | | | 72 | 72 |
| | | TMPTMA | part | 36 | 36 | | |
| | Condition of suspension | Agitation speed | rpm | 5000 | 5000 | 5500 | 5700 |
| | | Agitation time | min. | 10 | 10 | 40 | 40 |
| Properties of particles | Particle size | Volume average particle size (Dv) | μm | 3.65 | 3.44 | 3.58 | 3.22 |
| | | Number average particle size (Dn) | μm | 2.71 | 2.56 | 2.09 | 2.02 |

TABLE 1-continued

|  |  |  |  |  |  |  |  |
|---|---|---|---|---|---|---|---|
|  | Dispersion state | Coefficient of variation on a volume basis | % | 37.5 | 30.9 | 36.3 | 34.7 |
|  |  | Dn/Dw |  | 0.74 | 0.74 | 0.58 | 0.63 |
|  | Number proportion | at least twice the average thickness of the surface layer | % | 77.7 | 71.2 | 41.8 | 40.7 |
|  |  | at least three times the average thickness of the surface layer | % | 33.8 | 28.1 | 17.0 | 14.4 |
|  |  | at least four times the average thickness of the surface layer | % | 8.3 | 6.2 | 5.7 | 3.4 |
| Evaluations of film | Coefficient of dynamic friction (μk) |  |  | 0.084 | 0.100 | 0.098 | 0.084 |
|  | Judgement |  |  | good | good | good | good |
|  | Volume of dropped particles |  | μm³/mm² | 1700 | 1523 | 1585 | 1980 |
|  | Judgement |  |  | good | good | good | good |

|  |  |  |  | Comparative Examples |  |  |  |
|---|---|---|---|---|---|---|---|
|  |  |  |  | 1 | 2 | 3 | 4 |
| Production conditions of particles | Monomer | MMA | part | 324 | 324 | 324 | 288 |
|  |  | EGDMA | part |  |  |  | 72 |
|  |  | TMPTMA | part | 36 | 36 | 36 |  |
|  | Condition of suspension | Agitation speed | rpm | 5000 | 6000 | 5000 | 5500 |
|  |  | Agitation time | min. | 10 | 30 | 10 | 23 |
| Properties of particles | Particle size | Volume average particle size (Dv) | μm | 4.67 | 2.61 | 4.49 | 4.80 |
|  |  | Number average particle size (Dn) | μm | 2.54 | 1.76 | 3.09 | 2.59 |
|  | Dispersion state | Coefficient of variation on a volume basis | % | 36.4 | 37.1 | 32.8 | 34.6 |
|  |  | Dn/Dw |  | 0.54 | 0.67 | 0.69 | 0.54 |
|  | Number proportion | at least twice the average thickness of the surface layer | % | 55.6 | 28.7 | 82.5 | 54.1 |
|  |  | at least three times the average thickness of the surface layer | % | 30.0 | 5.3 | 46.4 | 31.8 |
|  |  | at least four times the average thickness of the surface layer | % | 14.6 | 0.6 | 20.7 | 17.9 |
| Evaluations of film | Coefficient of dynamic friction (μk) |  |  | 0.080 | 0.210 | 0.092 | 0.075 |
|  | Judgement |  |  | good | poor | good | good |
|  | Volume of dropped particles |  | μm³/mm² | 3333 | 1236 | 2191 | 2861 |
|  | Judgement |  |  | poor | good | poor | poor |

In Table, "MMA" stands for methyl methacrylate, "EGDMA" stands for ethylene glycol dimethacrylate, and "TMPTMA" stands for trimethylolpropane trimethacrylate.

INDUSTRIAL APPLICABILITY

According to the laminated resin film containing the organic polymer particles of the present invention, both a reduction in friction of the film and suppression of dropping-off of particles from the film surface can be achieved. Therefore, the anti-blocking property is appropriately imparted to the laminated resin film. In addition, the laminated resin film is suitably used as general packaging materials, food packaging materials such as food packaging films, and pharmaceutical packaging materials such as pharmaceutical packaging films.

EXPLANATION OF REFERENCES 1 organic polymer particle
2 surface layer
3 base film layer

The invention claimed is:

1. A laminated resin film comprising a base film layer and a surface layer, the surface layer comprising organic polymer particles serving as an anti-blocking agent,
   wherein the base film layer and the surface layer each contains a matrix resin, and the matrix resin consists of a polypropylene resin which has a unit derived from propylene of 90 mass % or more,
   wherein a number proportion of the organic polymer particles having a particle size that is at least twice an average thickness of the surface layer is 35% or more of a total number of the organic polymer particles,
   wherein a number proportion of the organic polymer particles having a particle size that is at least four times an average thickness of the surface layer is 10% or less of a total number of the organic polymer particles,
   wherein a number proportion of the organic polymer particles having a particle size that is at least three times an average thickness of the surface layer is from 12% to 40% of a total number of the organic polymer particles, and
   wherein a ratio of a volume average particle size of the organic polymer particles to an average thickness of the surface layer of the laminated resin film is 3.22 or more.

2. The laminated resin film according to claim 1, wherein a content of the organic polymer particles is 0.01 mass % or more and 5 mass % or less in 100 mass % of all components, which include the organic polymer particles, constituting the surface layer.

3. The laminated resin film according to claim 1, wherein the organic polymer particles have a coefficient of variation of particle size of 20% or more and 50% or less on a volume basis.

4. The laminated resin film according to claim 1, wherein the organic polymer particles have a volume average particle size of 0.5 μm or more and 20 μm or less.

5. The laminated resin film according to claim 1, wherein the surface layer has an average thickness of 0.2 μm or more and 10 μm or less.

6. The laminated resin film according to claim 1, wherein a difference between the volume average particle size of the organic polymer particles and the average thickness of the surface layer is 0.5 μm or more.

7. The laminated resin film according to claim 1, wherein a particle size distribution of the organic polymer particles is unimodal, as measured by a Coulter counter method.

8. The laminated resin film according to claim 1, wherein the organic polymer particles comprise at least one selected from the group consisting of a (meth)acrylic polymer and a styrenic polymer.

9. The laminated resin film according to claim 1, wherein a number proportion of the organic polymer particles having a particle size that is at least twice an average thickness of the surface layer is 50% or more of a total number of the organic polymer particles.

10. The laminated resin film according to claim 1,
wherein a number proportion of the organic polymer particles having a particle size that is at least twice an average thickness of the surface layer is 40.7% or more of a total number of the organic polymer particles, and
wherein a number proportion of the organic polymer particles having a particle size that is at least four times an average thickness of the surface layer is 8.3% or less of a total number of the organic polymer particles.

11. The laminated resin film according to claim 1,
wherein the organic polymer particles are (meth)acrylic polymers which contain a unit derived from a methyl methacrylate,
wherein a number proportion of the organic polymer particles having a particle size that is at least twice an average thickness of the surface layer is 38% or more of a total number of the organic polymer particles, and
wherein a number proportion of the organic polymer particles having a particle size that is at least four times an average thickness of the surface layer is 9% or less of a total number of the organic polymer particles.

12. The laminated resin film according to claim 1, wherein the organic polymer particles have a coefficient of variation of particle size on a volume basis of 30.9% or more.

* * * * *